Figure 1:
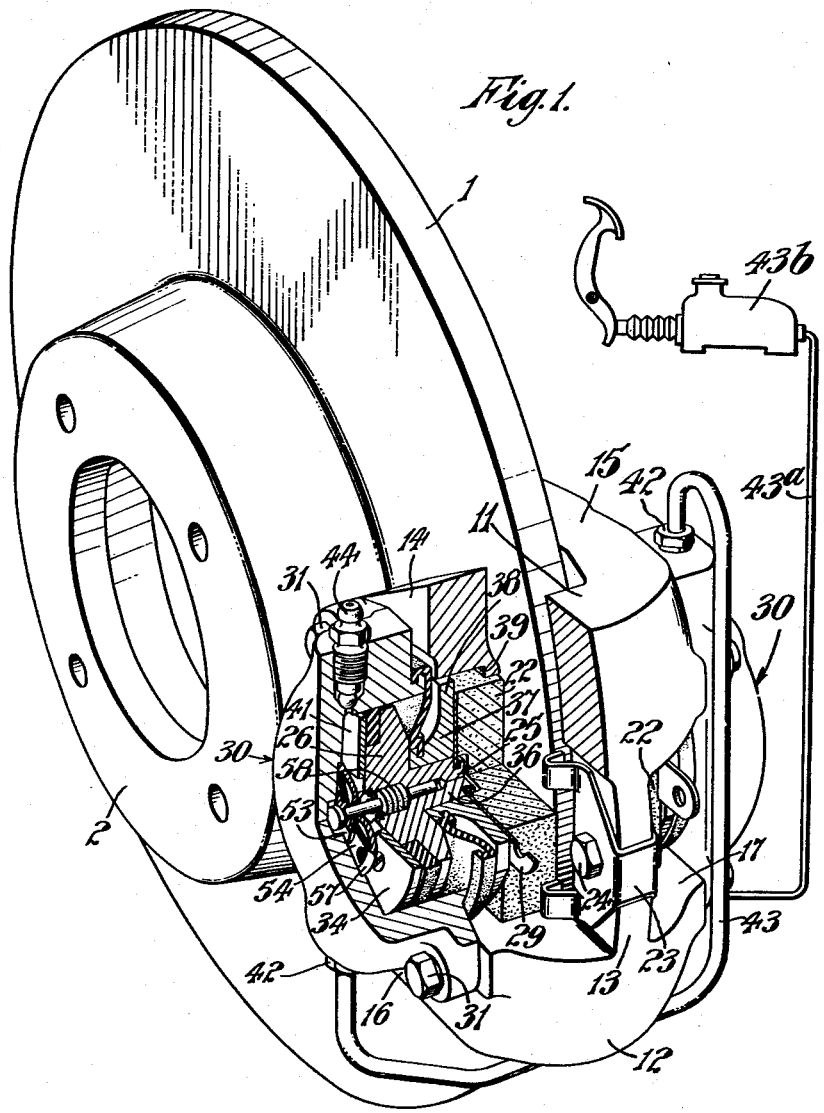

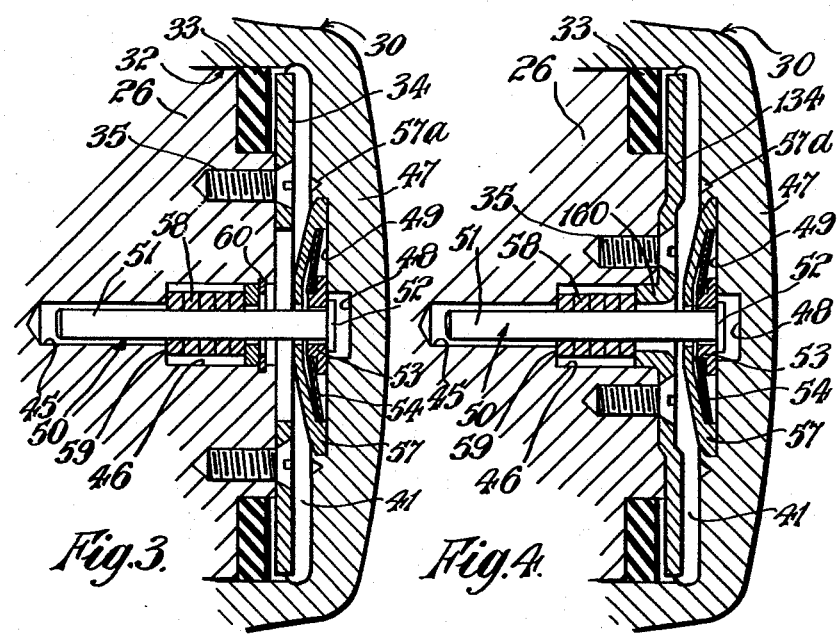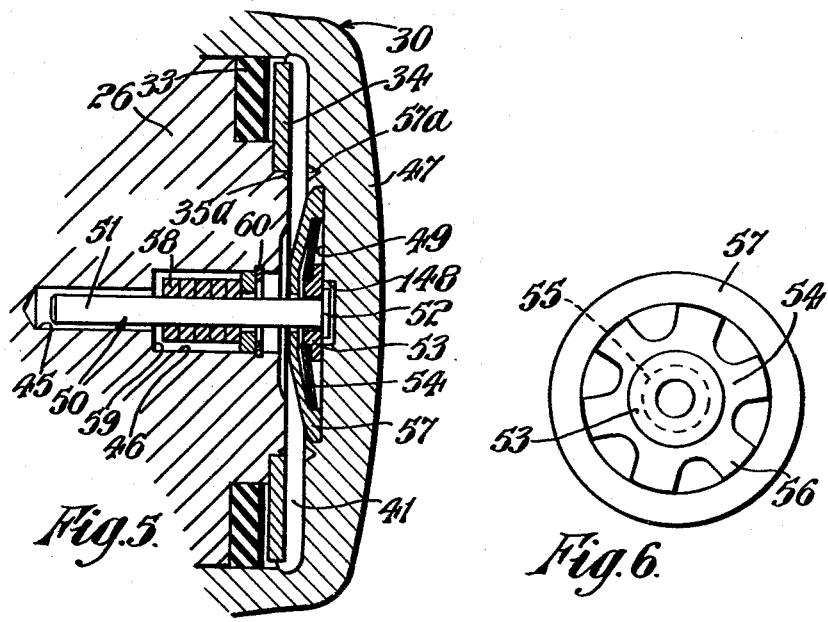

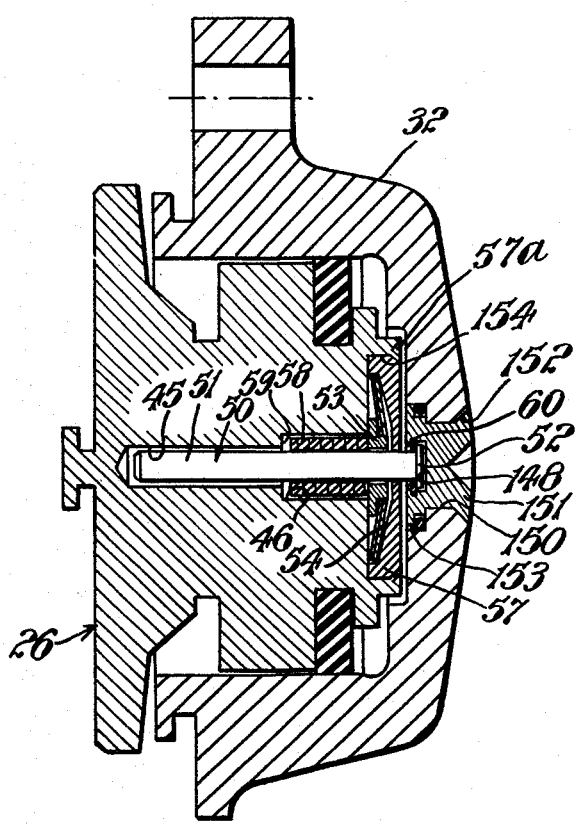

United States Patent Office 2,997,137
Patented Aug. 22, 1961

2,997,137
AUTOMATIC ADJUSTMENT DEVICES FOR BRAKES
Harold Hodkinson, Coventry, England, assignor to Dunlop Rubber Company Limited, London, England, a British company
Filed Apr. 1, 1958, Ser. No. 725,654
Claims priority, application Great Britain Apr. 1, 1957
3 Claims. (Cl. 188—73)

This invention relates to devices for automatically adjusting the retracted position of the pistons of hydraulically-operated disc brakes so that the pistons are moved substantially the same predetermined distance upon each application of the brake regardless of wear which may have occurred in the friction pads. It also relates to disc brakes comprising such devices.

In the specification of co-pending application of Butler Serial No. 644,023 and in the specification of Butler Patent 2,754,936 of July 17, 1956, and in British Patents 738,034 and 747,972 different types of automatic adjusting devices have been disclosed wherein a pin secured to either the piston or the cylinder of the fluid-pressure mechanism of a brake is frictionally associated with the cylinder or the piston of that mechanism so that when the brake is applied the piston is allowed to move freely relative to the cylinder in the brake-applying direction through a restricted distance only and any additional movement above the restricted distance is only made possible by overcoming the frictional engagement between the pin and the member with which it is frictionally associated. The extent of this restricted distance represents the normal clearance between the associated friction pad and the disc when the brake is disengaged and is normally of the order of .005" to .010". The piston is normally spring-urged away from the disc so that when the fluid pressure is released, the piston and the associated pad are retracted from the disc for a distance equal to the restricted distance.

Thus, the effect of the automatic adjusting device is to maintain the above clearance at a substantially-constant level regardless of the progressive wearing-away of the friction pad due to continued use, and the piston thus moves progressively outwardly of the cylinder as the automatic adjusting device operates.

Hitherto, it has been the practice to limit the axial movement of the piston away from the disc to an amount equal only to the restricted distance of from .005" to .010" through which it moves on application of the brake, so that when the resilient retraction means withdraws the piston from the disc to release the brake the associated pin is in solid abutment with the cylinder block.

It has been found, however, that the substantial out-of-plane movement of the disc due to bowing or deflection of the axle on cornering or running on a steeply-cambered road, or other causes, is often greater than the above clearance and consequently the disc may rub or strike against the pads, even when the brake is released. This causes undue wear of the pads and may, in extreme cases, be sufficient to force the piston back upon the pin by overcoming the frictional engagement of the automatic adjustment and so cause it to lose its correct adjustment.

It is the object of the present invention to provide an automatic adjustment device for a fluid-pressure operated disc brake or the like wherein these disadvantages are largely overcome. It is a further object of the invention to provide a disc brake comprising such a device.

Although in the above statement reference has been particularly made to a pin as being one of the members comprising the automatic adjusting device, this member need not necessarily be a pin per se, as any other suitable longitudinal member may be substituted therefor within the knowledge of the craftsman skilled in the art. Similarly, although in the annexed description of a specific form of the invention one particular form of interference member has been described, it will be obvious that other known types of friction device may readily be substituted therefor; the essence of the present invention residing not in the precise integers used in the invention, but in the manner in which they are combined to produce the desired result.

According to the present invention, an automatic adjusting device for the piston and cylinder mechanism of a fluid-pressure operated disc brake, comprises a connecting member between said piston and said cylinder, said piston being movable in one direction to apply the brake and being returned a predetermined distance by spring means associated with said connecting member after each application of the brake, friction means associated with said connecting member to permit progressive relative movement between the piston and the connecting member to compensate for wear of the brake pads and a clearance space to permit return movement of said piston in excess of said predetermined distance upon oscillation of the disc of said brake normal to the plane of its rotation.

Preferably said piston and connecting member are resiliently urged to said intermediate position, away from said disc, by a compression spring located between a projection on said connecting member and a portion of said cylinder. Preferably, also, said connecting member comprises a cylindrical pin and said projection is an enlarged head on the end of said pin remote from said piston.

Also according to the invention, a fluid-pressure operated disc brake comprises a rotatable disc, a cylinder non-rotatably associated with said disc, a piston fluid-tightly slidable within said cylinder and operable to press an associated pad of friction material into frictional contact with said disc, said piston and said cylinder being frictionally connected by an automatic adjusting device as herein defined.

Figure 2:
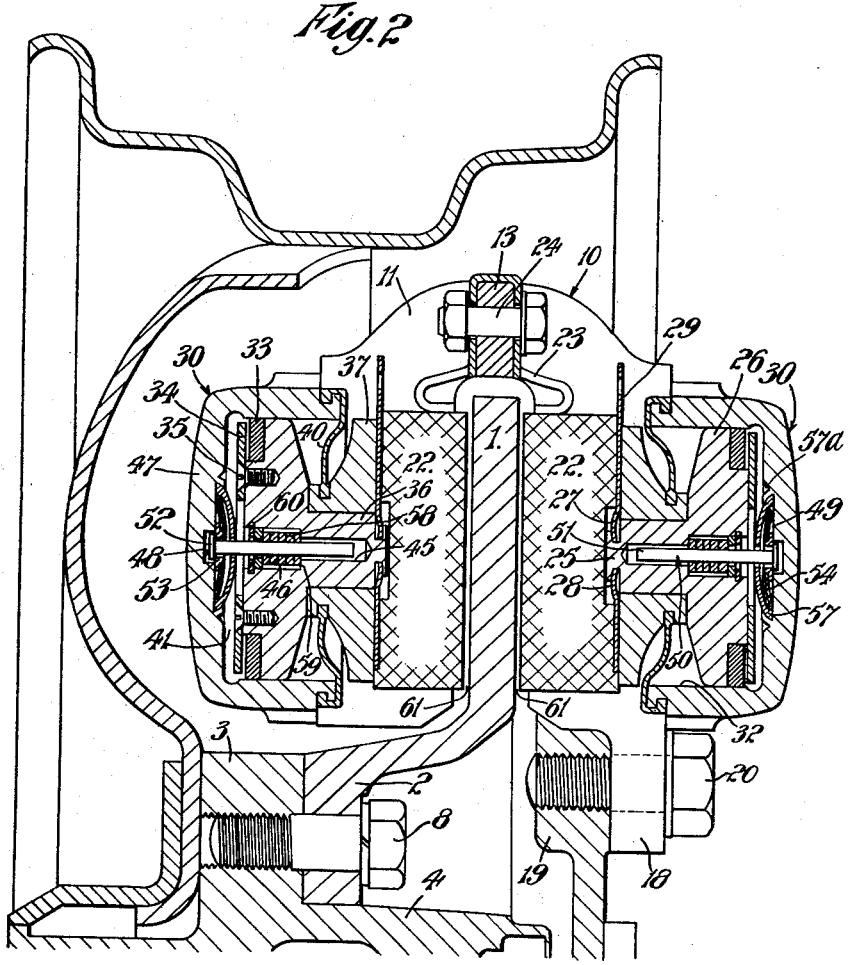

A better understanding of the present invention may, however, be obtained from the following description of one embodiment thereof when this is read with reference to the accompanying drawings, of which:

FIGURE 1 is a perspective, partly-sectional, view of a disc brake according to the invention, FIGURE 2 is a section on the line 2—2 of FIGURE 1 with portions of a wheel and the brake-mounting arrangement added, FIGURES 3, 4 and 5 are enlarged sections of a portion of a piston and cylinder mechanism showing alternative constructions of the automatic retraction device; FIGURE 3 showing the construction of FIGURES 1 and 2, FIGURE 6 is an enlarged view of a retraction spring, and FIGURE 7 is an enlarged section of a still further form of automatic retraction device.

As illustrated in FIGURES 1 to 3 of the drawings, a disc brake comprises a rotatable disc 1 having an axially-offset annular portion 2 adapted to be secured to a radial flange 3 on the hub 4 of a vehicle wheel. The disc portion 2 is secured to the flange 3 by bolts 8.

A non-rotatable housing 10, which may be of one of the types more specifically described in co-pending application of Butler Serial No. 666,354, comprises two circumferentially-spaced inverted U-shaped members 11, 12 connected by a bridge 13 which is of slightly less axial width than the disc 1. The housing 10 is so disposed that the arms 14, 15 and 16, 17 of the respective members 11, 12 straddle the disc 1 with said arms lying adjacent and parallel to the opposite radial surfaces of the disc, and the bridge 13 lies adjacent its outer periphery and parallel with its plane.

The arms 15 and 17, which lie on the same side of the disc 1, are each extended in the form of a lug 18 (FIGURE 2) and these lugs are adapted to be secured to a nonrotatable portion of the vehicle, such as to a flange 19 on the axle or axle housing, as by the bolts 20.

The adjacent inner faces of the limbs 14, 16 and 15, 17 on opposite sides of the disc are parallel to each other and to the radius of the disc which passes medially therebetween, and these faces provide supporting means for the friction pads 22 against movement in either direction of rotation of the disc. The pads 22 are adapted to slide axially between these faces upon application and release of the brake and are also adapted to slide therebetween, radially of the disc, to permit them to be inserted or removed from the housing without it being necessary to interfere with any other portion of the brake, all as described in the above mentioned co-pending application Serial No. 666,354. A retainer 23 is detachably secured to the bridge 13 to prevent the pads 22 from radially-outward movement, and radially-inward movement is prevented by the abutment of a stud 25 on the end of the piston 26 with the inner end 27 of a slot 28 formed in the backing plate 29 to which each pad 22 is secured.

A piston 26 is fluid-tightly slidable in each of a pair of cylinder blocks 30 secured by bolts 31 to the axially-outer faces of the respective limbs 14, 15 and 16, 17 so that the pistons 26 lie co-axially of the pads 22 axially-outwardly thereof. Each cylinder block comprises a bore 32 in which a piston 26 is fluid-tightly slidable, each piston 26 being provided with an annular sealing ring 33 secured to the piston 26 by an annular ring 34 held in place as by screws 35.

At the axially-inner end of each piston 26 a co-axial spigot 36 is formed and an outwardly-flared foot 37 is pressed on the spigot 36 and has diametrically-opposite arcuate end portions 38 which are adapted to slide axially in grooves 39 formed in the inner faces of the limbs 14, 15, 16 and 17. The stud 25 projects from the foot 37 and an annular folded diaphragm 40 has its peripheries located in appropriate annular grooves in the foot 37 and the cylinder block 30 to provide a seal for the open end of the bore 32.

A space 41 is left between the head of the piston 26 and the base of the bore 32 and this space 41 is adapted to be filled with pressure-fluid through fluid connections 42 and conduits 43, 43a upon actuation of a master-cylinder 43b or other actuating device, in the known manner. An air bleed screw 44 is provided in one of the cylinder blocks 30.

As so far described, the brake operates in the known manner. Upon admission of fluid-pressure to the spaces 41, the pistons 26 are forced outwardly in the bores 32 until the pads 22 engage the rotating disc and apply a frictional braking torque thereto. Shear stresses on the pads 22 are absorbed by the appropriate faces of the limbs 14, (15, 16 and 17. Upon release of the fluid-pressure in the spaces 41 the pressure on the pad 22 is relieved and, if a retraction spring is provided, they are drawn away from the disc.

Due to repeated applications of the brake the pads 22 gradually wear away and unless means are provided to compensate for this wear, the operative movement of the pistons 26 gradually increases until it becomes unduly great.

The automatic adjusters disclosed in the aforementioned co-pending application Serial No. 644,023 and in British Patents 738,034; 747,965 or 747,972 automatically compensate for this wear by moving the piston progressively in the cylinder towards the disc as the pad wears away, thus keeping the piston movement substantially constant. If the disc is oscillating or vibrating, its aberrations may be greater than the clearances provided by these adjusters, and in this case it will strike or rub the friction pads and either cause a partial application of the brake and undue wear of the pads, or will knock the pistons back along the connecting pins by overcoming the frictional engagement of the friction member therewith and so will put the brake out of adjustment until again applied. This will cause unnecessary wear in the frictional connection of the piston and adjusting pin.

The present automatic adjuster which avoids this disadvantage comprises a deep bore formed co-axially in the piston 26 (see particularly FIGURE 3) and comprising a small diameter portion 45 and a large diameter portion 46 adjacent the crown, or head, of the piston 26. Coaxially thereof, and in the base 47 of the cylinder 32, a further recess is formed and has a small diameter portion 48 and a large diameter portion 49 extending into the inner face of the cylinder base 47.

A pin 50, having a smooth cylindrical shank 51 and a disc-like head 52 of substantially less axial thickness than the depth of the recess 48, has its head 52 located in the recess 48 with the shank 51 extending co-axially of the cylinder 32.

An annular stepped bush 53 of two successive external diameters is placed on the shank 51 of the pin 50 so that its larger diameter portion abuts the adjacent side of the head 52 and also abuts the base of the larger diameter recess 49. The diameter of this larger diameter portion of the bush 53 is greater than the diameter of the recess 48 so that the bush cannot enter into this recess. The smaller diameter portion of the bush 53 extends axially outwards in the recess 49 and an annular concave star spring 54 (FIGURE 6) has its inner aperture 55 located around this smaller diameter portion of the bush with its concavity facing towards the base of the recess 49 and its star-like springy arms 56 engaging the closure cap 57 against an annular ledge inwardly of its periphery. The pin head 52, bush 53 and star spring 54 are held in the recesses 48, 49 by a dished closure cap 57 which is located in the recess 49 with its concavity facing into the recess and is secured therein as by peening or upsetting the edge of the recess 49 as at 57a (FIGURE 2). The axial length of the bush 53 is such in relation to the concavity of the closure cap 57 that the pin 50 and bush 53 are permitted a slight axial movement outwardly in the recesses 48, 49 against the spring 54, before the bush 53 abuts the concave surface of the closure cap 57. This movement is of the order of .005" to .010" and represents the clearance 61 (FIGURE 2) normally existing between the pads 22 and the disc 1 when the brake is disengaged. The outer face of the head 52 is clear of the base of the recess 48 so that it has limited free axial movement into the recess 48 independently of the spring 54.

As illustrated in FIGURE 3, the frictional engagement between the pin 50 and the piston 26 is provided by an interference member 58 anchored in the larger recess 46 of the piston 26 by a circular spring clip 60. It will be obvious however that other types of interference member may be used to provide the required frictional engagement between the piston and the pin. These may, for instance, comprise a plurality of split spring washers, or rubber bushes split collars or collets. Alternatively the shank 51 may be split longitudinally and spread so that the shank itself frictionally engages the piston without any intermediary interference member.

As illustrated, however, the interference member 58 comprises a close-coiled helix of spring wire, preferably of square section, which is a loose fit in the recess 46 in the piston 26 and is held therein against axial movement between the step 59, at the junction of the recesses 45 and 46, and the spring clip 60. The inner diameter of the helix is such that it engages the shank 51 of the pin 50, which is passed therethrough into the recess 45 with a predetermined degree of frictional interference.

When the pin 50 and interference member 58 are thus positioned and engaged and the fluid-pressure space 41 is bled of air, the normal static head of pressure-fluid in the space 41 holds the head 52 of the pin 50 in abutment with the bush 53. As is known in the art, the static head of fluid-pressure is provided by placing the fluid reservoir higher than the brake-operating mechanisms. The static head of pressure thus provided is of a very low order, but is sufficient to keep the brake actuating mechanisms in abutment ready for instant application without the lost-motion that would be necessary to take up the slack between non-abutting components. The static head also serves to prevent air being drawn into the pressure-fluid conduits and spaces.

Upon application of the brake as previously described the pistons 26 will move until the friction pads 22 are in contact with the disc 1 and if the pins 50 and interference members 58 are correctly adjusted, the heads 52 of the pins 50 will move the stepped bushes 53 against the springs 54 until they come into abutment with the closure cap 57, to prevent further movement of the pins 50, just as the pads 22 engage the disc 1. Upon release of the fluid-pressure, the springs 54 will regain their concavity and will withdraw the pistons 26 and pads 22 away from the disc 1 for a distance equivalent to the normal clearances 61 between the friction pads 22 and the disc. The axial length of the bushes 53 and the concavity of the closure cap 57 are predetermined to produce this result.

If, upon applying the brake, the bushes 53, or either one of them, abut the closure caps 57 before the pads 22 are in engagement with the disc 1, as may be occasioned by wear of one or both of the pads 22, the pins 50 will be prevented from further movement towards the disc 1 but the pistons 26 will continue to move until the pads 22 actually engage the disc, and this continued movement will cause the frictional engagement between the shanks 51 and the interference members 58 to be broken and the interference members 58 will move on the shanks 51, towards the disc 1, until the friction pads 22 are fully engaged. Upon release of the brake, the springs 54 will retract the pistons 26 and pads 22 only by the amount of the movement of the bush 53, and the clearances 61 will be maintained regardless of pad wear; the pistons 26 progressively moving down the cylinders 32 as wear takes place but the clearances 61, on retraction of the pads, remaining substantially constant throughout. This adjustment normally will occur while the brake is engaged and will be progressive through very minor increments as the wear is actually taking place.

If, when the brake is released, the disc should oscillate or vibrate and strike the pads 22, they will be pressed back away from the disc 1, together with the pistons 26 and pins 50, the heads 52 of which will be moved away from the bushes 53 and deeper into the recesses 48 without interfering with the frictional engagement between the pins 50 and the pistons 26.

Thus, an oscillating or vibrating disc will merely push the substantially-unresisting pads out of its path, with a corresponding reduction in the wear of the pads, without interfering with the normal adjustment of the automatic adjusting devices. The pistons will still be subject to the slight back pressure of the static head of pressure-fluid which will tend to move the heads of the pins out of the recesses 48 into contact with the bushes 53. The static head is of a low value, however, and its major function will be to reinstate the clearances 61 immediately the condition of the disc's rotation allows, thereby maintaining the normal condition of the brake whenever conditions permit. The minor resistance provided by the static head of pressure-fluid is immeasurably less than that induced by the solid abutment of the heads of the pins with the cylinder blocks, pistons, pressure plates or friction pads of the previously-known constructions.

As shown in FIGURE 4, the annular ring 134 may be of such internal diameter as substantially to cover the end of the recess 46 with only sufficient central aperture to permit the pin shank 51 to be freely slidable therein. The ring 134 is offset towards its inner periphery, away from the closure cap 57 to allow axial movement of the piston and pin towards the closure cap 57 without fouling the head of the piston. The inner periphery of the ring 134 is provided with an annular flange 160 which enters the end of the recess 46 and holds the interference member 58 firmly against the step 59 in lieu of the spring clip 60 and bush 60a. This device operates precisely as does the device of FIGURE 3.

In the embodiment shown in FIGURE 5, the recess 148 is reduced in depth so that the head 52 of the pin 50 is held loosely between the bush 53 and the base of the recess 148 with no significant axial movement away from the bush 53 and only sufficient looseness to prevent the shank 51 from binding in the recess 45. The recess 46 is extended deeper into the piston 26 so that the interference member 58 is given axial movement therein between the spring clip 60 and the step 59 between the recesses 45 and 46, instead of the head 52 of the pin being axially movable in the recess 148. In this case, the interference member 58 is normally in abutment with the bush 60a and spring clip 60 leaving a clearance between its inner end and the step 59. The clearance 61 between the pad 22 and the disc 1 is maintained by the spring 54 as before, but if the disc 1 should oscillate or vibrate and strike the pad 22, the pad 22 and piston 26 will move relatively to the interference member 58 which will be approached by the step 59. The static head of pressure-fluid will tend to keep the interference member 58 normally in contact with the spring clip 60. In this instance, the annular ring 34 is secured to the piston head by peening over the metal of the piston head around its inner periphery as at 35a.

In the embodiment of the invention shown in FIGURE 7 the piston 26 contains the two-diameter axial recesses 45, 46 as before. A hole 150 is formed through the base of the cylinder 32 co-axially of the recesses 45, 46 and a bush 151 is secured therein as by peening the axially-outer peripheral edge thereof over a tapered portion 152 of the recess 150. The bush 151 has a radially-outwardly directed flange 153 on its axially-inner end, and this is received in a complementary recess in the base of the cylinder. The head of the pin 50 is secured in a recess on the inner end of the bush 151 by a circular spring clip 60 and has only sufficient movement in the recess to enable the pin 50 to move angularly sufficiently to prevent the shank 51 from binding in the recess 45.

The shank 51 of the pin 50 extends axially into the recesses 45, 46 and is frictionally engaged by the friction member 58 which is loosely located in the recess 46. A large diameter recess 154 is formed in the head of the piston 26 co-axially of the recess 46 and the bush 53, previously referred to, is located in this recess with its larger diameter portion abutting the base of the recess 154. The pin 50 passes loosely through the bush 53 and through the star spring 54. The bush 53 and spring 54 are held in the recess 154 by a closure cap 57 which is secured in the recess as by peening as at 57a. The bush 53 has axial movement in the recess between the piston and the inner surface of the closure 57 which is equal to the normal clearance between the friction pad and the disc, as previously described.

This embodiment operates in substantially the same way, as that described in relation to FIGURE 5 of the drawings, except that the restricted movement between the piston and the cylinder to take up the brake clearances now takes place in the piston instead of in the base of the cylinder as in the previous embodiments. If the disc oscillates and strikes the friction pad when the brake is retracted, the knock-back movement of the piston takes place between the friction member 58 and the step 59 in the base of the recess 46.

Having now described my invention, what I claim is:
1. An automatic adjusting device for fluid operated brakes which comprises a fluid motor having a cylinder and a piston slidable longitudinally in said cylinder forwardly to apply said brakes and reversely to release said brakes, said cylinder comprising at its rear end a rear stop and a forward stop spaced forwardly of said rear stop and a recess extending rearwardly of said rear stop, a spring fixed to said cylinder, said spring having a part movable between said stops, a connector from said spring to said piston, said connector having a head abutting the rear of said part of said spring movable between said stops and movable rearwardly of said spring part into said recess and having a frictional engagement between said connector and said piston sufficient to move said connector to deflect said spring to said forward stop and to withdraw said piston rearwardly from its brake applying positions upon return of said spring to its rear stop, said frictional engagement permitting forward movement of said piston beyond the forward limit of movement of said connector and said movable part of said spring to said forward stop by fluid pressure sufficient to overcome said frictional engagement.

2. The automatic adjusting device of claim 1 in which the connector and piston move backwardly relatively to said spring upon reverse movement of said piston beyond the point of return by said spring.

3. The adjusting device of claim 1 in which said spring is a star spring having a central opening through which said connector extends.

References Cited in the file of this patent

UNITED STATES PATENTS

| | | |
|---|---|---|
| 636,330 | Glover | Nov. 7, 1889 |
| 2,358,740 | Scott-Iverson | Sept. 19, 1944 |
| 2,657,772 | Chamberlain et al. | Nov. 3, 1953 |
| 2,790,515 | Hawley | Apr. 30, 1957 |
| 2,808,903 | Kovac | Oct. 8, 1957 |
| 2,866,526 | Wiseman | Dec. 30, 1958 |

FOREIGN PATENTS

| | | |
|---|---|---|
| 717,350 | Great Britain | Oct. 27, 1954 |